July 17, 1962    J. L. RUSSELL    3,045,089
ELECTRICALLY ACTUATED CONTACTING DEVICE
Original Filed Nov. 22, 1957    3 Sheets-Sheet 1

July 17, 1962   J. L. RUSSELL   3,045,089
ELECTRICALLY ACTUATED CONTACTING DEVICE
Original Filed Nov. 22, 1957   3 Sheets-Sheet 2

United States Patent Office 3,045,089
Patented July 17, 1962

3,045,089
ELECTRICALLY ACTUATED CONTACTING DEVICE
John L. Russell, Waterbury, Conn., assignor to The Bristol Company, Waterbury, Conn., a corporation of Connecticut
Original application Nov. 22, 1957, Ser. No. 698,208, now Patent No. 2,960,585, dated Nov. 15, 1960. Divided and this application July 7, 1960, Ser. No. 41,354
2 Claims. (Cl. 200—166)

This invention relates to electrically actuated contactors and, more particularly, to a form of contact assembly especially well suited for use in a "chopper" adapted for synchronously interrupting electric circuits at a relatively high rate.

This application is a division of my co-pending application Serial No. 698,208, filed November 22, 1957, is now U.S. Patent No. 2,960,585, and assigned to the assignee of the present application.

Modern usage of devices of this class, for example in the instrumentation of aircraft and missiles, has imposed the most rigorous requirements not only in the direction of high speeds of operation, but also with respect to minimum size and weight, immunity from effects of shock and vibration, more effective shielding from external electromagnetic and electrostatic fields, minimizing of thermal effects, and ability to operate at higher contact voltages. I have disclosed and claimed in an application filed June 14, 1955, Serial No. 515,373, assigned to the assignee of the present application now U.S. Patent No. 2,866,028, a contactor device of this class in which considerable improvement along the aforesaid lines has been accomplished. I have found that further substantial unique improvements as well as advantages are attained in accordance with my present invention.

It is, therefore, a principal object of this invention to provide an adjustable contact assembly particularly well suited for use in contacting devices of small and compact form wherein it is essential that the size and weight of component parts be minimized, and achieving a high degree of magnetic and electrical efficiency.

It is a further object of this invention to provide such an adjustable contact assembly in which the biasing force acting on the contact member may be readily adjusted prior to incorporation of the assembly in a device such as a chopper.

It is a still further object of this invention to provide such an adjustable contact assembly in which the biasing force acting on the contact member may be readily adjusted prior to incorporation of the assembly in a device such as a chopper and after having been so incorporated the position of the biased contact may be readily adjusted without disturbing or changing the biasing force.

It is still another object to provide an adjustable contact assembly which is rugged, durable in construction, relatively inexpensive to manufacture, and suited to production on a quantity basis.

Further objects as well as advantages of my invention will be apparent from the following description and the accompanying drawings of an exemplary embodiment thereof, in which FIGURE 1 is an isometric exploded view of the parts of a contactor incorporating an adjustable contact assembly constructed according to my invention;

Figure 1:
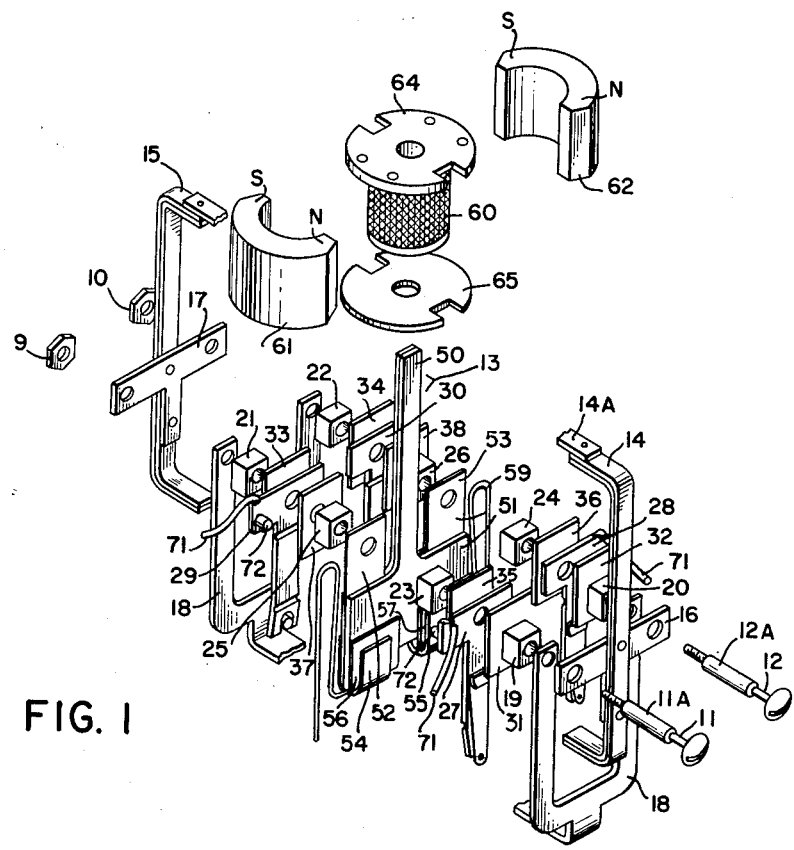
Figure 3:
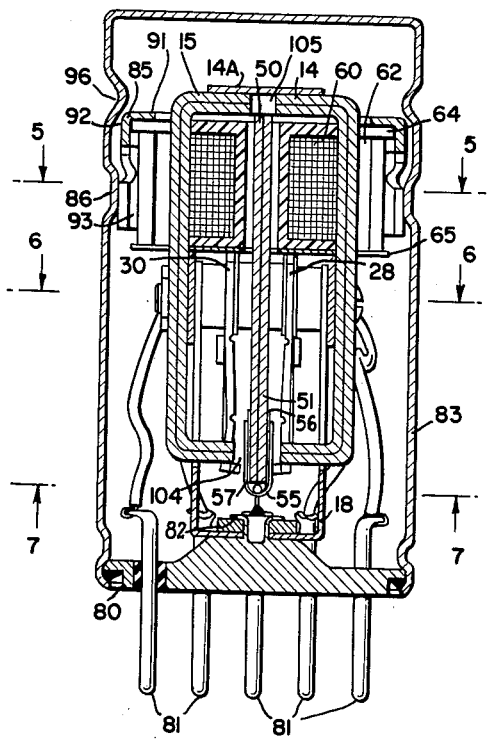
FIGURE 3 is a vertical cross-sectional view of the device assembled and mounted within a sealed enclosure.

Referring now to the drawings and to FIGURE 1 in particular, the structure is assembled stack-wise on two bolt members 11 and 12. Insulating sleeves 11A and 12A provide for electrical isolation of various members from the bolts and on assembly, the various members are retained by nuts 9 and 10 applied to these bolts. The stacked elements are disposed on the mounting bolts symmetrically on either side of a central armature member 13. The outer elements of the stack are C-shaped pole-pieces 14 and 15 made of laminated transformer iron or similar magnetic material. Riveted to these are cross arms 16 and 17 of nonmagnetic material drilled to receive the insulated mounting bolts 11 and 12 and fix the relative positions of the stacked elements. Next in order in the stack is a U-shaped, double-forked, mounting bracket 18, the forked elements, shown broken apart in FIGURE 1, being actually joined at the bottom of the bracket as shown in FIGURE 3 and having a riveting hole therein for fastening to a base member as described hereinafter. Spacer members 19, 20, 21, 22, and also 23, 24, 25, 26 serve to locate fixed contact assemblies 27, 28, 29, 30 with respect to the other parts of the structure, and insulating washers 31 to 38, inclusive, of thin sheet mica or similar insulating material, serve to isolate these contact members electrically from the rest of the structure. These contact assemblies will be described in detail hereinafter.

The centrally disposed movable armature member 13 is a generally inverted T-shaped member consisting of a stem portion 50 and a broadened crosspiece portion 51 formed of magnetic material such as transformer iron. Preferably, but not necessarily, this is formed of two identical plates joined together, and between them is sandwiched a sheet of thin resilient material of more or less the same shape, except for projections, or tabs, 52, 53, protruding from the upper side of each arm of crosspiece 51. On assembly, these tabs are included in the bolted stack and form hinges or flexure members providing pivot points for the movable armature member.

It may be observed here with reference to this armature structure that, in practice, it is preferred to design it for operation either in a resonant or non-resonant condition. When operated at or near resonance, temperature effects on the flexure pivots will, of course, cause significant shifts in the point of resonance, in which case the resilient material may be chosen with the property of constant modulus of elasticity, such as the nickel-iron alloy Ni-Span C (a trademark of the International Nickel Co., Inc., New York, New York).

On each of the outer portions of the crosspiece 51 are fixed contact members 54 and 55 formed of suitable contact materials, preferably of the precious-metal class. These are of a U-shape, bent over the edge of the armature crosspiece 51 so as to expose a continuous contact surface on both sides of the armature. The contact surface of contact member 54 is adapted to make contact with either one of oppositely disposed fixed contacts 27, 29 juxtaposed thereto. Similarly, the contact surface of contact member 55 is adapted to make contact with either one of oppositely disposed fixed contacts 28, 30 juxtaposed thereto. The contact members 54 and 55 are insulated from the armature and each other by interposed barrier members 56 and 57 of insulating material, in each case, the contact and insulator being cemented together and to the armature. Connections between the moving contacts 54 and 55 and fixed circuit elements are made through resilient looped wires 58 and 59, respectively. On assembly, the upper loops of these wires are clamped between insulating pins 72, thereby preventing damaging vibrations in unsupported connecting leads.

Energizing or "driving" coil 60 fits over stem portion 50 of the armature 13, the center hole therein permitting freedom of movement of this stem as determined by pivot members 52 and 53. On assembly, the coil rests on the stacked elements, with a thin, metallic, electrostatic shield member 65 interposed, and is enclosed on two sides within the upper portions of the C-shaped pole-pieces 14 and 15. The coil form on which the coil 60 is wound is formed with an upper end 64 of enlarged diameter with holes through which connecting leads may be threaded and with cut-out portions to receive the pole pieces 14 and 15 on assembly.

Permanent magnets 61 and 62 of C-shape in cross section are disposed in the assembly with like poles juxtaposed, enclosing the exposed portions of the energizing coil 60, and making physical contact with the edges of the upper portions of C-shaped members 14 and 15.

A strap member 14A of non-magnetic material joins the upper ends of the two C-shaped pole pieces 14 and 15 for the purpose of fixing the dimensions of the air-gap formed by the juxtaposition of the polar members at this point. This strap is riveted or welded to the pole pieces and is of sufficient resilience to permit bending as required in assembly operations.

Figure 7:
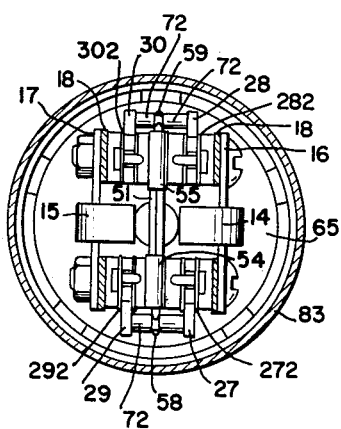
FIGURE 7 is a horizontal sectional view through the line 7—7 in FIGURE 3.
Figure 6:
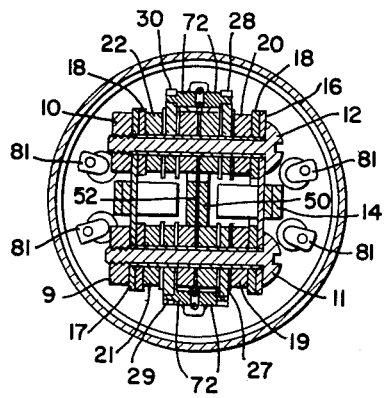
FIGURE 6 is a horizontal sectional view through the line 6—6 in FIGURE 3.
Figure 8:
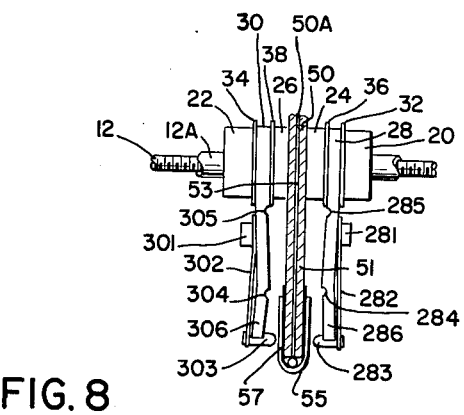
FIGURE 8 is an elevational view partially in section, on an enlarged scale of a pair of the contact members shown in FIGURE 1.

The fixed contact members 27, 28, 29 and 30 are most clearly shown in FIGURE 8 in which one set only is shown. In the double-pole double-throw embodiment under consideration, the corresponding set of fixed contacts, 27, 29, is identical in form and symmetrically placed in the stack structure as shown most clearly in FIGURE 7. In FIGURE 8 the view is a vertical cross-section through the armature showing the elements of the stacked assembly physically adjacent to the one set of fixed and movable contacts shown segregated from the rest of the structure for convenience. The contact assemblies 28 and 30 are placed on opposite sides of the armature 51 and separated respectively from it by spacer 24 and spacer 26. Insulator 36 is interposed between spacer 24 and contact assembly 28 and insulator 38 is interposed between spacer 26 and contact assembly 30 to provide electrical isolation from the armature. On the sides of the contact assemblies away from the armature 13, the contact assemblies 28 and 30 are spaced and insulated with respect to other parts by spacers 20 and 22 respectively and insulators 32 and 34 respectively. The bolt 12 and insulating sleeve 12A provide support for the several parts as shown.

The fixed contact assembly 28, for example, consists of the rigid supporting member 286 and resilient spring member 282 of brass or similar conductive material, the latter being riveted to the former by rivet 281 at a point spaced away from the stacked assembly. To the outer end of the resilient member, the contact button 283 is riveted or welded and is of a material suitable to the requirements of electrical contacts such as well-known alloys of the platinum group. The supporting member 286 is formed with two transversely-cut notches 284 and 285, the one spaced from and on the side of rivet 281 toward the free end of the supporting member and the other located between the rivet 281 and adjacent elements of the stacked assembly. These notches conveniently serve to localize bends made in the supporting member 286 for adjustment purposes. On assembly, the outer end of the supporting member 286 is given a slight bend at the notch 284 in a direction toward the resilient spring member 282 thereby deflecting the spring member and placing it in an initially stressed condition. The existence of this force due to prestressing the fixed contact is useful in regulating and minimizing undesirable effects such as contact "bounce" from the impact of the movable contact 55 under operating conditions. The support member 286 is bent about the second notch 285 whereby to adjust independently as desired the spacing of the contact 283 with respect to the armature contact 55 without alteration of the prestressed state of the contact button. The corresponding parts of contact assembly 30 are designated in FIGURE 8 by reference characters having the same suffix numeral as those described in connection with contact assembly 28 and with "30" as a prefix. Similarly, the corresponding parts of contact assemblies 27 and 29 are designated in FIGURES 1 and 3 by reference characters which include the prefix "27" and "29" respectively.

A plug-in bayonet type base member 80 is provided with insulated lead-ins 81 of conventional design. Mounting bracket 18 holding the contactor structure is fixed to base 80 by a rivet 82. Enclosure 83 envelops the structure and is soldered or otherwise sealed to the base member 80. Since shielding from external fields is provided for by other means hereinafter described, the enclosure may be of a non-magnetic material to provide solely for hermetic sealing of the device. The base 80 may be of metal through which conducting pins 81 are sealed by glass, ceramic or other insulating material.

Figure 4:
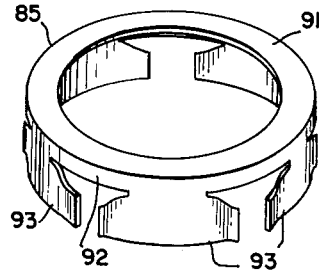
FIGURE 4 is an isometric view of the retaining ring.
Figure 5:
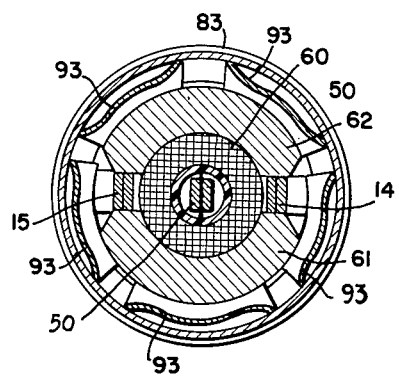
FIGURE 5 is a horizontal sectional view through the line 5—5 of FIGURE 3.

A resilient retaining ring member 85 placed between the top of the mount assembly and the enclosure member 83 holds the contactor structure in fixed relation to the enclosure. Ring 85 is shown in detail in FIGURE 4. It consists of a metallic ring 92, the end of which is rolled or spun over to form a lip portion 91. The ring portion 92 is partly formed into curvate tabs 93 which are flared and curved to form approximately tangential projections. The unit structure is formed of a thin resilient metal such as spring brass. On assembly the retaining ring is slipped over the top of the contactor structure and the lip 91 rests on the enlarged upper face of coil form 64. The enclosure 83 is then fitted over the spring tab projections 93, and as the enclosure is pushed down, the spring tabs register with an inwardly extending annular projection 86 formed in the enclosure 83 which forces the tabs 93 into frictional engagement with the permanent magnets, gripping them and the assembly embraced thereby rigidly, thus fixing the relation of parts to the outer shell and inhibiting undesirable vibrations of the contactor structure. A second and somewhat deeper inwardly extending annular projection 96 formed in the enclosure wall above the first such projection 86 prevents longitudinal movement of the retaining ring 85 which would tend to move the said ring out of engagement with the contactor structure.

Figure 2:
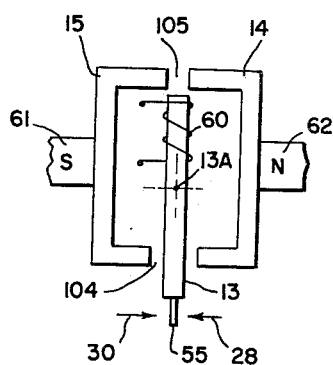
FIGURE 2 is a schematic diagram illustrating the principle of operation of the device.

As an aid to the understanding of the principle of my invention, FIGURE 2 is included to show diagrammatically the structure and magnetic circuit of the embodiment hereinbefore described. Though shown diagrammatically, the parts shown in FIGURE 2 are designated by the same reference characters applied to corresponding parts in the other views of the drawings.

Parallel magnetic paths of low reluctance, one formed by pole-piece 14 and the other formed by pole-piece 15, lead from the permanent magnets 61, 62 to the two air gaps, or interspaces, 104, 105 in operative relation to which is disposed the movable armature 13 adapted for limited rotary oscillation about an axis indicated at 13A extending between the pivots formed by tabs 52, 53. The upper arms of polar members 14 and 15 are juxtaposed to define the interspace 105 to which the upper end of armature 13 closely approaches but does not enter. The lower arms of the members 14 and 15 in juxtaposed relation also define an interspace 104 through which the lower portion of the armature passes. Only one, contact member 55, of the two borne by armature 13 is shown in FIGURE 2 and it engages alternately corresponding fixed contact members 28 and 30. The energizing coil 60 surrounds the armature near the upper end, allowing movement of the armature therein, and is itself enclosed within the fixed magnetic circuit elements 14, 15, 61 and 62. For simplicity the single pair of fixed contacts 28—30 and the armature contact 55 are only shown in FIGURE 2.

Important advantages of the present invention resulting from the improved linear relationship between armature deflection and the force required to move the armature may be best appreciated by reference to FIGURE 2. In principle, due to the symmetrical arrangement, the armature under the influence of the permanent field alone, remains centrally aligned with respect to the air gaps. With the energizing coil 60 energized, it will be apparent that alternating flux will traverse the armature and, depending upon relative polarities, will interact with the permanent field flux in the air gaps to cause the armature 13 to move in one direction or the other. It may be observed, qualitatively, that it is the inherent property of the relation of the armatures and pole pieces at the end of the structure at which the armature extends through the air gap 104, that the movement of the armature toward the pole to which it is attracted is such as to change the length of the air gap, between them, holding meanwhile the gap areas substantially constant. At the same time, at the other end of the structure where the armature is juxtaposed to the fixed pole pieces but does not enter the interspace therebetween, the movement of the armature toward the pole to which it is attracted is such as to change the effective area of the air gap between them while maintaining the length of the gap substantially constant. Recalling now that the attractive force or "pull" of a magnet on a movable armature is a function of the derivative of the energy in the air gap with respect to distance therebetween, it will be apparent in the former case that the concentration of flux lines, or energy, in the air gap 104 will increase non-linearly with the movement of the armature from a minimum value at the position of symmetry and thereby, correspondingly, increase the attractive force. In the latter case the concentration of flux lines, or energy, in the effective air gap 105 will be at a maximum at the point of symmetry and as the armature moves toward the pole toward which it is attracted the useful energy decreases in a non-linear manner to a minimum as the armature approaches the said pole. Thus the force will, at one end, vary in the opposite sense from that affecting the other end of the armature and together they will tend toward an overall linear force acting on the moving armature. The above relationships are sufficient for purposes of qualitative explanation. A precise, quantitative explanation involves highly complex factors which would unnecessarily burden the present description. However, it is to be noted that these characteristics offset one another and their net effect has been found to provide a more linear relation between armature deflection and the force required to move the armature. The fact that the air gaps in the magnetic circuit are readily controllable in this design makes possible the balancing of the above effects for most efficient operation. Also, since in practice contactors of this type are commonly used at frequecies at or near the resonant frequency, the controllability of mechanical circuit constants and the proportioning of the armature structure makes readily possible the adaptation of the armature to a condition of saturation at the desired extreme positions of travel.

This linearity has been found to have important advantages especially on efficiency of operation. Qualitatively, efficiency of a chopper of this class may be stated as a function of the extent to which the wave form of the energizing voltage coincides with the wave form of the generated counter electromotive force. Since this counter electromotive force is largely produced as a result of the rate of change of field flux, it is thus directly related to the rate of change of reluctance due to armature oscillation. High efficiency in this design has been accomplished by (a) the balanced armature disposed in compensatory relation with respect to air gaps, (b) providing low reluctance paths for field flux wholly through iron, except for operational air gaps, and (c) provision for relatively liberal size of magnets for the permanent magnetic field. Concomitant to the achievement of high values of efficiency in this design, an important and desirable effect is the reduction in physical size of the structure to a minimum. Furthermore, minimizing of the power required by the driving coil which results therefrom minimizes also heating effects of the coil and disturbing effects of the current in the lead-in conductors. Still another advantage is the increased armature travel and contact pressures permitted by the greater efficiency of operation. The greater travel is immediately reflected in higher permissible contact voltages resulting in a greater range of practical applicability of this device.

The spurious effect of impinging external electromagnetic fields are dealt with by favorably locating the magnetic circuit elements with respect to the energizing coil and the armature, the coil being essentially surrounded, and the armature paralleled thereby. In particular, there are provided low reluctance paths in shunt relation to the ends of the armature which thus reduce the tendency of the spurious flux values to flow lengthwise through the armature and produce unsymmetrical biasing effects thereupon. Necessity for further enclosure by electromagnetic shielding is thus avoided with the concomitant benefit of avoiding the weakening effect on the permanent magnets of additional ferromagnetic shielding members. Permanent enclosure may be accomplished by using non-magnetic materials.

Furthermore, the balanced mechanical design has been found to be particularly immune from spurious operation under condition of shock or vibration by reason of the symmetrical distribution of mass about the pivot points of the armature.

Figure 9:
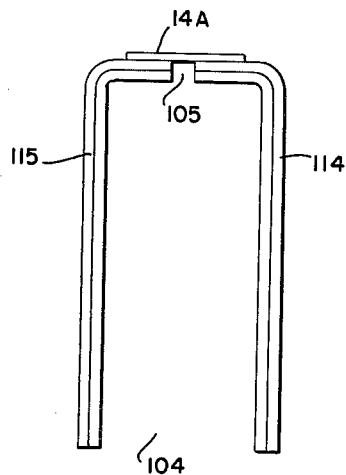
FIGURE 9 is an elevational view showing a modification of the polar members.

While, to be sure, the hereinbefore described compensatory effect of the forces of attraction between the two ends of the armature and the associated pole pieces may be fully realized in the form illustrated in FIGURES 1 to 3 and 5 to 7 it should be noted that by sacrifice to a more or less degree of the full compensatory effect certain practical advantages may be gained. For example, air gap 104 may be increased to the point of eliminating completely the lower horizontal portions of the polar members 14 and 15. Referring now to FIGURE 9, polar members 114 and 115 correspond respectively to members 14 and 15, differing therefrom only in that they are L-shaped rather than C-shaped. The device when assembled with members 114 and 115 therein replacing members 14 and 15, respectively, differs from that shown in FIGURE 3 only in that the air gap 104 now extends entirely across the space between the lower extremities of the elongated, longitudinal portions of polar members 114 and 115 as viewed in FIGURE 9. It has been found that the loss in efficiency of operation by this simple modification may be considered compensated for by the practical advantage of easier assembly and the further advantage that the strip members 14a may be made rigid thereby firmly establishing the critical air gap 105. Meanwhile all other structural features of this device are unchanged and the hereinbefore recited advantages are retained.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. An adjustable contact assembly, comprising a substantially rigid elongated one-piece, unitary support member having a free end, means rigidly anchoring the opposite end portion of said support member, said support member having a pair of transverse grooves formed therein spaced from each other and said free end, each of said grooves forming a narrow sharply defined transversely extending area of reduced thickness, the one of said grooves remote from said free end of said support member being positioned in close substantially contiguous relation with the anchored portion of said support member, an elongated resilient member connected adjacent to one end thereof to said support member intermediate said grooves, the other end portion of said resilient member being free and juxtaposed to said free end of said support member and having a contact surface projecting beyond said support member.

2. An adjustable contact assembly, comprising a substantially rigid elongated one-piece, unitary support member having a free end, means rigidly anchoring the opposite end portion of said support member, said support member having a pair of transverse grooves formed therein spaced from each other and said free end, each of said grooves forming a narrow sharply defined transversely extending area of reduced thickness, the one of said grooves remote from said free end of said support member being positioned in close substantially contiguous relation with the anchored portion of said support member, an elongated resilient member connected adjacent to one end thereof to said support member intermediate said grooves, the other end portion of said resilient member being free and having a contact surface projecting therefrom in the direction of said support member, said support member being deformable transversely thereof along that one of said grooves intermediate its free end and the other of said grooves to engage said resilient member and stress the same to a predetermined amount, and said support member being deformable transversely thereof along said other groove to displace the contact surface relative to the other end of said support member while maintaining said stress undisturbed.

References Cited in the file of this patent
UNITED STATES PATENTS

| | | |
|---|---|---|
| 1,531,347 | Rhodes | Mar. 31, 1925 |
| 2,290,725 | Bartels et al. | July 21, 1942 |

FOREIGN PATENTS

| | | |
|---|---|---|
| 143,497 | Switzerland | Jan. 16, 1931 |